United States Patent [19]
Guay et al.

[11] Patent Number: 5,390,263
[45] Date of Patent: Feb. 14, 1995

[54] METHOD AND APPARATUS FOR CONTEXT SENSITIVE POST PROCESSING TO SELECT AN APPROPRIATE MODULATION PATTERN FOR A PIXEL BASED UPON NEIGHBORING PIXELS

[75] Inventors: Randall G. Guay, Cupertino; Kok Chen, Palo Alto, both of Calif.

[73] Assignee: Apple Computer, Inc., Cupertino, Calif.

[21] Appl. No.: 183,633

[22] Filed: Jan. 18, 1994

Related U.S. Application Data

[63] Continuation of Ser. No. 767,175, Sep. 27, 1991, abandoned.

[51] Int. Cl.$^6$ ............................................. G06K 9/38
[52] U.S. Cl. .................................. 382/50; 358/456; 358/458
[58] Field of Search .............. 382/40, 50; 358/455, 358/456, 458, 459; H04N 1/40

[56] References Cited

U.S. PATENT DOCUMENTS

| | | | |
|---|---|---|---|
| 4,782,398 | 11/1988 | Mita | 358/280 |
| 4,819,066 | 4/1989 | Miyagi | 355/14 E |
| 4,831,392 | 5/1989 | Dei | 364/519 |
| 4,837,846 | 6/1989 | Oyabu et al. | 382/50 |
| 4,989,098 | 1/1991 | Arimoto | 358/455 |
| 5,029,227 | 7/1991 | Kawamura | 382/54 |
| 5,075,780 | 12/1991 | Shibahara | 358/298 |

FOREIGN PATENT DOCUMENTS 0499288 8/1992 European Pat. Off. .

*Primary Examiner*—David K. Moore
*Assistant Examiner*—Andrew W. Johns
*Attorney, Agent, or Firm*—Blakely, Sokoloff, Taylor & Zafman

[57] ABSTRACT

An apparatus and method for imaging using context sensitive pixel modulation wherein a modulator dynamically examines the neighboring pixels to the current pixel being imaged and uses the neighboring pixel information in determining the specific modulation pattern for the current pixel.

18 Claims, 3 Drawing Sheets

METHOD AND APPARATUS FOR CONTEXT SENSITIVE POST PROCESSING TO SELECT AN APPROPRIATE MODULATION PATTERN FOR A PIXEL BASED UPON NEIGHBORING PIXELS

This is a continuation of application Ser. No. 07/767,175, filed Sep. 27, 1991, now abandoned.

BACKGROUND OF THE INVENTION

1. Field of the Invention

The present invention relates generally to imaging apparatus and methods, and more particularly to an apparatus and method for producing high definition grayscale images using context sensitive pixel modulation.

2. Brief Description of the Field

Imaging systems have improved dramatically over the past several years, requiring increased emphasis on designing system components which contribute in producing high quality final output images at increased overall savings to the consumer. The drive for high quality imaging devices, i.e., printers and monitors, has mandated increased efficiency in allocating expensive electronic components, i.e., memory, while providing better resolution and greater numbers of colors or gray levels.

In traditional imaging systems, a code-word is used to describe the manner in which a given area is to be imaged. This code-word is normally a multi-bit data pixel which can, for example, represent a given gray level. In most prior art systems, a modulator takes this multi-bit data pixel and attempts to create a gray level over the area addressed by that pixel by writing "black" in a small imaged area in a field of "white". The human eye perceives the average of this area as a gray level. An inherent problem with this type of system, however, is that certain imaging devices, particularly laser scanning electrophotographic print engines, have more addressable points than their resolution supports. In other words, data pixels which do not overlap in the system's pixel map will overlap in the imaging device. A direct result of this is that writing a gray level next to a black, gray or white area all produce different final output image results.

One method for achieving better resolution in the final output image is to use pulse width modulation to image the output pixels. Briefly, pulse width modulation is a technique for subdividing each output pixel into a much smaller unit (in the above example, the unit of time that the laser is writing "black"). As an example of the benefits of pulse width modulation, let us assume that we have an imaging area comprised of a 4-pixel-by-4-pixel cell. Given the parameters of this cell, using traditional modulation we can achieve 17 gray levels (0/16, 1/16, 2/16, . . . , 16/16). A 5-pixel-by-5-pixel cell would enable us to achieve 26 gray levels, and so on. The main problem is that we need substantially more than 30 levels of gray in order to produce a final output image with good resolution without contouring. However, using the traditional method of imaging, the imaging area becomes too large when trying to use more than a 4-pixel-by-4-pixel imaging area.

We can overcome this limitation and squeeze more gray levels out of the 4×4 area by turning on partial pixels. That is, by dividing an output pixel into smaller units, we can achieve a substantially greater number of gray levels using the same imaging area. For instance, we could now have 0.6/16 as one achievable gray level (as opposed to the simple integer combinations described above).

However, a consequence of using pulse width modulation to image gray levels is that the position of dot growth can become very important. The "dot" produced by the laser can usually grow from the center, left, right, or in from the edges. Depending on the neighboring pixels surrounding the current pixel (the output pixel being currently imaged), differing results in gray level imaging can occur. Thus, there arise many situations in which one wants to add gray to the specific right or left of a given pixel to increase the resolution of the final output image and enhance the final overall output image quality.

Traditionally, shifting the portion or direction of pixel growth is done by relating a code word to the partial pixel being imaged. For example, 0001 could be used to designate a small pixel growth from the right and 1000 could be used to designate the same pixel growth, but from the left. Thus, when it is desired to shift the pixel growth toward a given imaged area, a code word would be associated with the partial pixel to be imaged in a manner that would enable this shifting. Unfortunately, this requires more frame store space in which to store the additional codewords to indicate pixel growth direction. This, consequently, greatly increases the cost of the imaging device.

SUMMARY OF THE INVENTION

In the system and method in accordance with the preferred embodiment of the present invention, a pixel map sends a multibit representation of the output pixel data for a given image to a modulator. This output pixel data contains only grayscale level information and no information relating to dot growth direction. The modulator hardware examines each output pixel's immediate neighbor to determine how to modulate the print engine based on the adjacent output pixel data. The imaged portion of the pixel being modulated (the "current pixel") is shifted towards other imaged pixels to cause the imaged portion of the current pixel to be placed adjacent to other imaged portions. This allows codes reserved for images to dynamically shift left or right depending on the surroundings, and allows the maximizing of gray levels that can be represented while reducing imaged to non-imaged transitions. In a laser scanned synchronous printing device, this reduces the intensity of engine artifacts, saves memory, and increases print quality.

DETAILED DESCRIPTION OF THE PREFERRED EMBODIMENTS

Figure 1:
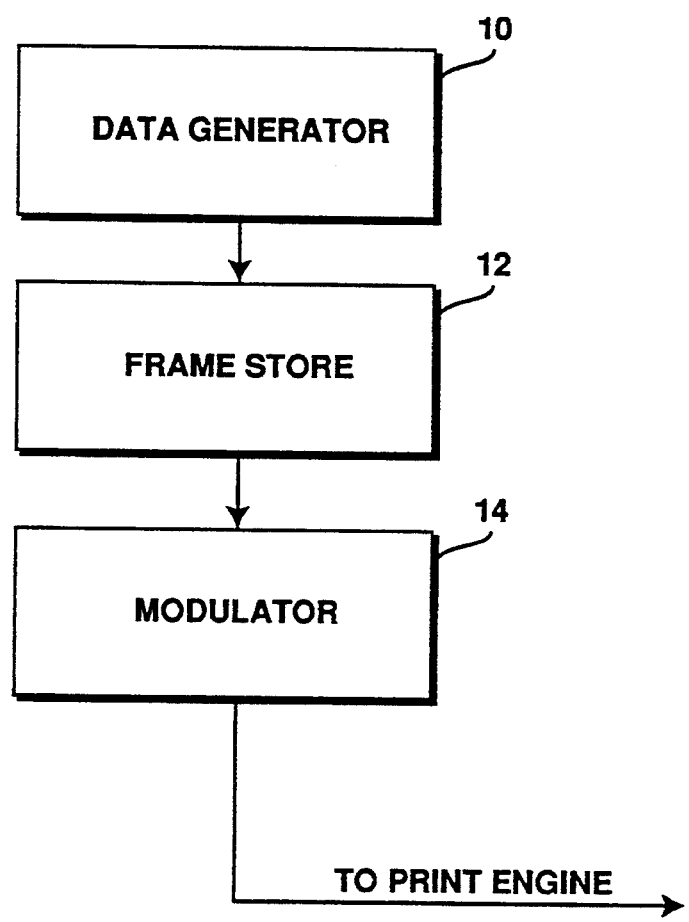
FIG. 1 is a block diagram illustrating the general components of the imaging system and method in accordance with the present invention.

Referring now to FIG. 1, shown is a block diagram illustrating the general system and method in accordance with the present invention. The output from a Data Generator 10 is coupled to the input of a Frame Store 12, the output of which is coupled to the input of a Modulator 14. The output from Modulator 14 is coupled to a print engine which produces a final output image. For the purposes of explanation of the preferred embodiment, the term "data generator" has been used to denote a device which provides imaging information in digital form. For example, devices which provide scanned images, font rasterizations, line art, and the letter "E" would all be considered data generators. The term "frame store" has been used to denote in general the group of devices normally referred to as frame buffers, bit maps, pixel maps, FIFOs, band buffers, etc.

In the preferred embodiment, the data from Data Generator 10 is encoded using the encoding method as described in the co-pending U.S. patent application Ser. No. 07/768,134 filed on Sep. 27, 1991 and entitled, "Method and Apparatus for Enabling Intelligent Post-Processing of Differing Data Types" by Kok Chen and Randy Guay, the entirety of which is hereby incorporated by reference. Briefly, using the method described therein, differing data types are encoded with different values such that intelligent post-processing of the imaging data can proceed according to data type. In the system as depicted in FIG. 1, the modulator would thus be able to recognize and differentiate between different data types (i.e., text data versus grayscale image data). The encoded imaging data from the data generator is sequentially stored in Frame Store 12 which operates as a pixel map for use in producing a final output image. The encoded frame stored data is then sequentially transmitted to Modulator 14 which uses a look-up table and context sensitive pixel modulation (as described in further detail below) to drive the print engine. In the preferred embodiment, a laser scanning electrophotographic print engine is used to produce the final output image.

As described briefly above, it is often desirable to add a non-integral amount of black to the right or left of a given pixel in order to increase the number of gray levels in the final output image. This has traditionally been done by using a separate codeword to explicitly control the manner in which the pixel is grown. One of the advantages of the apparatus and method of the present invention resides in the modulator's ability to assume the responsibility for controlling right or left pixel growth, thus freeing the frame store memory that would otherwise have to be dedicated to storing this information. That is, the post-processing portion of the imaging system can determine the appropriate growth direction of an output pixel by examining the pixel's context, i.e., it's neighboring pixels. As a specific example, if a black pixel is located to the left of the current pixel, and a white pixel is located to the right of the current pixel, then the current pixel would be modulated to grow from the left. This allows a single codeword to be used to represent a fractional growth in black, regardless of growth direction.

Figure 2:
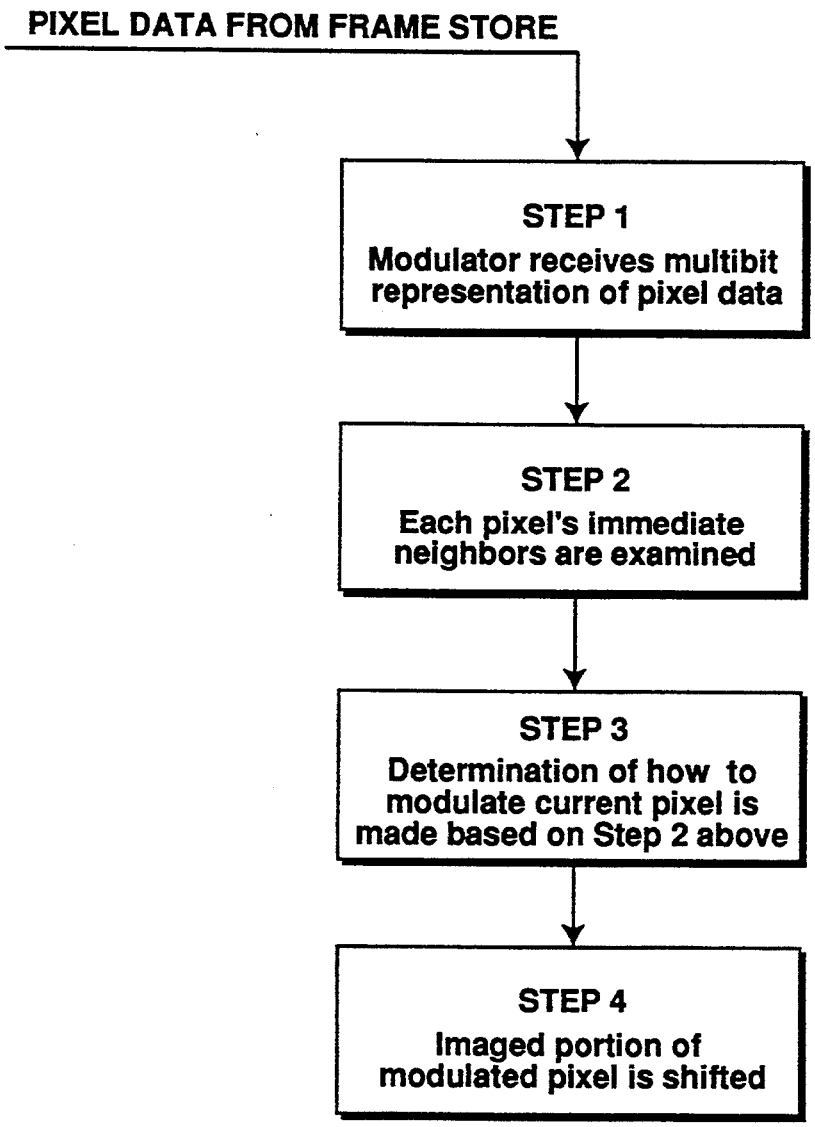
FIG. 2 is a flowchart illustrating the general sequence and steps undertaken by the modulator in performing context sensitive pixel modulation in accordance with the present invention.

Referring now to FIG. 2, shown is a flow chart illustrating the general operation of the modulator in performing the context sensitive pixel modulation described generally above. Pixel data from Frame Store 12 has been encoded as described above and is input into Modulator 14. As illustrated in FIG. 2, in a first step, Modulator 14 receives the multibit representation of the pixel data. This data does not contain dot growth direction information but does, for example, represent that a given individual output pixel is to be imaged $\frac{1}{8}$ gray, $\frac{1}{4}$ gray, etc. In a second step, each output pixel's immediate neighboring pixels are examined. This enables the modulator to accumulate information regarding the gray level of each of the pixels surrounding a given individual pixel. In step 3, a determination of how to modulate the current pixel is made based on the information gained from the second step. And, in step 4, the imaged portion of the current modulated pixel is shifted (or not shifted) in accordance with the determination made in step 3.

Figure 3:
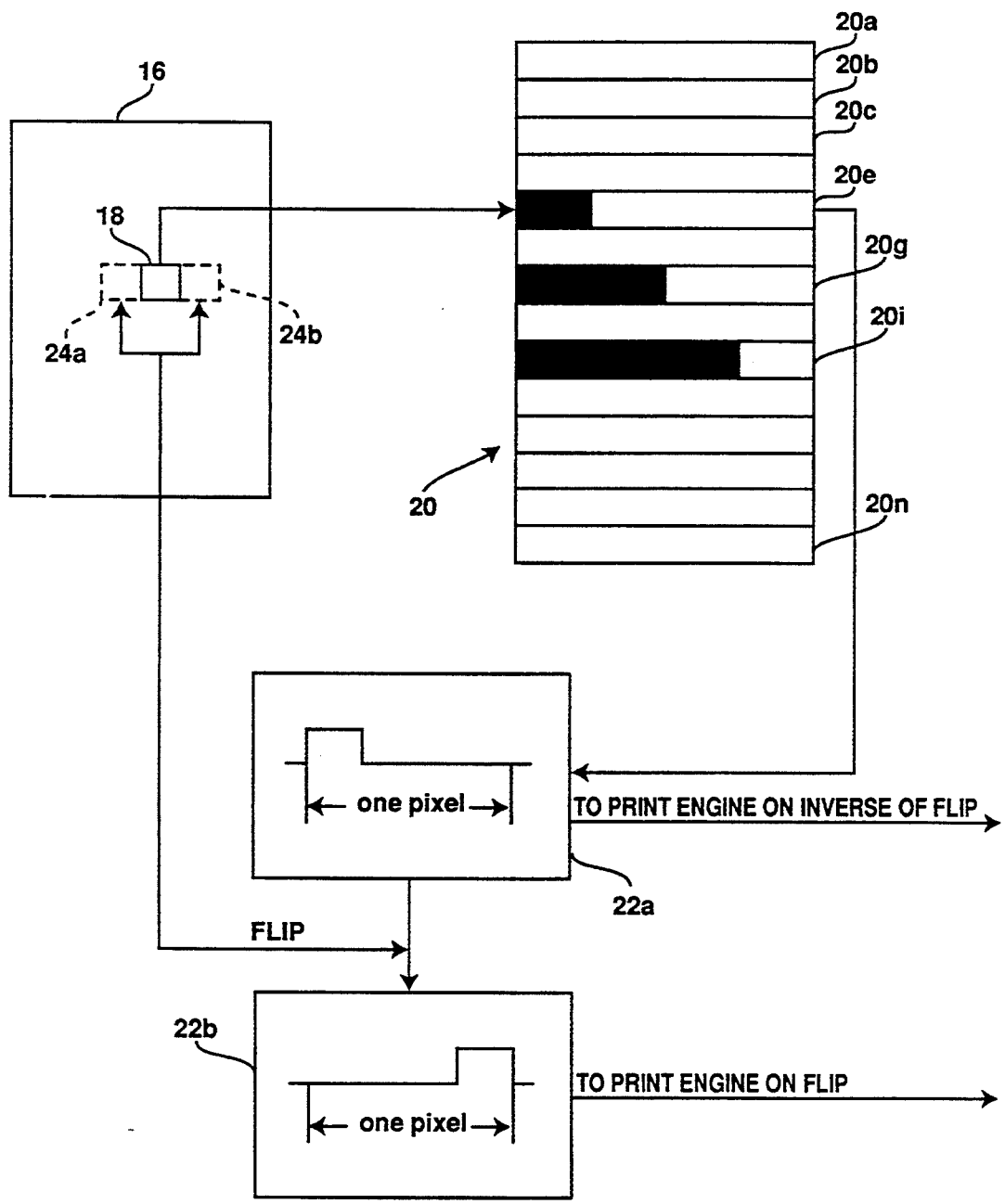
FIG. 3 is an illustration of the specific operation of the context sensitive pixel modulation in accordance with the preferred embodiment of the present invention.

For a more detailed description of the above process, please refer now to FIG. 3. Shown in FIG. 3 is a specific example of context sensitive pixel modulation in accordance with the preferred embodiment of the present invention. For the purposes of the present illustration, Memory Element 16 is representative of a page, or portion, of memory stored in Frame Store 12 (shown in FIG. 2). Pixel Sub-Element 18 is a multi-bit data pixel carrying imaging information relating to a corresponding output pixel. In the preferred embodiment, Pixel Sub-Element 18 is a 4-bit number which is used downstream to index a Lookup Table 20. Although not shown in complete format in FIG. 3, each line of Lookup Table 20 would normally contain imaging patterns similar in construction to those that are shown in the figure.

In the embodiment of FIG. 3, Lookup Table 20 includes 14 Lines, 20a–20n, each of which represents a different modulation pattern for imaging a single output pixel. Each line contains 16 bits of information, each bit translating into either a "black" or "white" image at the print engine. For example, Line 20e would correspond to an output pixel modulation as represented by Output Pixel Modulation Diagram 22a. Modulation Diagram 22a actually represents a timing diagram used to modulate the laser when producing the final output image. Examination of Diagram 22a will show that the pulse corresponds to the portion of Line 20e comprising bits representative of a "black" image, and the trough (flat line portion of the diagram) corresponds to the portion of Line 20e comprising bits representative of a "white" image. Thus, for the amount of time represented by the pulse of Diagram 22a, the laser will image a corresponding portion of the output pixel with "black". For the trough of Diagram 22a, the laser will image the corresponding portion of the output pixel with "white". In the preferred embodiment, each output pixel is divided into 16 parts corresponding to the 16 bits in an individual line of Table 20.

In the implementation of context sensitive pixel modulation as shown in FIG. 3, logic in the modulator is operative to examine Neighboring Pixel Sub-Elements 24a and 24b, which are juxtaposed to Pixel Sub-Element 18. Depending on the information gained by the modulator in relation to this examination, the modulator would either modulate the laser with the exact bit pattern from the appropriate line of Table 20, or it would activate a bit which represents the command "flip", and thereby modulate the laser with a reverse pattern in relation to the bit pattern of this line in Table 20. In an alternative embodiment, the modulator would use this same information to select an exact bit pattern from a plurality of look-up tables. Shown below, for purposes of illustration only, is an exemplary decode table which could be used by the modulator in performing the above described examination:

Definitions:

G=gray pixel
B=black pixel
W=white pixel
X=any shade of pixel (does not matter)
−2=two pixels previous to current pixel
−1=one pixel previous to current pixel
0=current pixel
1=next pixel after current pixel
2=second pixel after current pixel
Modulation could be based on the following criteria:

| Pixel | −2 | −1 | 0 | 1 | 2 | |
|---|---|---|---|---|---|---|
| | X | W | G | G | W | FILL FROM RIGHT SIDE OF PIXEL |
| | W | G | G | W | X | FILL FROM LEFT SIDE OF PIXEL |
| | X | W | G | B | X | FILL FROM RIGHT SIDE OF PIXEL |
| | X | B | G | W | X | FILL FROM LEFT SIDE OF PIXEL |

Of course, other selection criteria may be applicable in differing systems.

For a specific example, let us assume that Pixel Sub-Element 18 is a four bit number which corresponds to a single output pixel, and which represents the number "6." Modulator 14 receives the number "6" from Frame Store 12 and uses it to index Lookup Table 20. In this example, the number "6" corresponds to the sixth line of Table 20, Line 20e. If no context sensitive pixel modulation were to be performed, the modulator would use the exact bit pattern of Line 20e to modulate the laser and image the single output pixel.

However, in accordance with the preferred embodiment, the modulator examines the neighboring pixels to Pixel Sub-Element 18 prior to actually modulating the laser. That is, Neighboring Pixel Sub-Elements 24a and 24b are examined before a determination of the exact modulation pattern is made. Thus, let us assume that Neighboring Pixel Sub-Element 24a is a 4-bit number which corresponds to Line 20g of Table 20, and that Neighboring Pixel Sub-Element 24b is a 4-bit number which corresponds to Line 20i of Table 20. The modulator logic would "examine" Pixel Sub-Element 24a and determine that it has been imaged such that the portion of the pixel closest to Pixel Sub-Element 18 is white; this color determination of the neighboring pixel, 24a, is made based on the data supplied from memory 16 and not the output modulation pattern of pixel 24a. Likewise, the modulator logic would "examine" Pixel Sub-Element 24b and determine that it is going to be imaged such that the portion of the pixel closest to Pixel Sub-Element 18 is black; this determination of the neighboring pixel, 24b, is made based on the data supplied from memory 16 and not the output modulation pattern of pixel 24b. The modulator logic would then activate a bit to signal the reverse of the bit pattern represented by Line 20e. Reversing this bit pattern produces a timing diagram for modulating the laser as illustrated by Output Pixel Modulation Diagram 22b. As is illustrated, Diagram 22b is actually the reverse of Diagram 22a. This effectively enables modulation of Pixel 18 such that the black portion of the pixel is imaged against the black portion of Pixel 24b, and the white portion of Pixel 18 is imaged against the white portion of Pixel 24a.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

For example, the terms "white" and "black" have been used extensively throughout the explanation of the preferred embodiment. This has been done by way of example only to illustrate that a portion of an output pixel is actually imaged (i.e., toner is applied to the paper) and a portion of the pixel is left unimaged (i.e., the laser is off, and no toner is applied). It is certainly contemplated that the method of context sensitive pixel modulation described above is applicable to color systems as well. Additionally, other specific methods of adjusting individual output pixel modulation are contemplated. For example, a different type of lookup table could be used, and the shifting of the pixel modulation could be achieved by signaling the modulator to use a different line of the table in accordance with the neighboring pixel information.

What is claimed is:

1. A method for performing context sensitive pixel modulation in an imaging system which utilizes a plurality of multibit data pixels including imaging information for modulating a plurality of corresponding output pixels, said method comprising the steps of:
   determining a first modulation pattern for a current output pixel using a corresponding first said multibit data pixel;
   determining a second modulation pattern for a first neighboring output pixel to said current pixel and a third modulation pattern for a second neighboring output pixel to said current pixel using a corresponding second and third said multibit data pixel, respectively;
   performing a comparison of said first modulation pattern with said second and third modulation patterns to determine the exact manner in which said current output pixel is to be imaged;
   modulating said current output pixel in accordance with said comparison to generate either (1) an output modulation pattern derived from said first modulation pattern and not from said second or third modulation patterns, or (2) a reverse of said output modulation pattern; and,
   repeating each said step for each said output pixel until a final output image is completed.

2. A method as described in claim 1 wherein said first, second and third modulation patterns are determined using said first, second and third multibit data pixels, respectively, to index a lookup table containing exact bit sequences for modulating each corresponding said output pixel.

3. A method as described in claim 2 wherein said first neighboring output pixel is disposed to the left of said current output pixel and said second neighboring output pixel is disposed to the right of said current output pixel.

4. A method as described in claim 2 wherein an exact bit sequence from said lookup table corresponding to said current output pixel is either directly used to modulate said current output pixel or is reversed and used to modulate said current output pixel according to said comparison.

5. An apparatus for performing context sensitive pixel modulation in an imaging system which includes means for creating a plurality of multibit data pixels including imaging information for modulating a plurality of corresponding output pixels, said apparatus comprising:

determining means for determining a first modulation pattern for a current output pixel using a corresponding first said multibit data pixel and a second and third modulation pattern for said current pixel's neighboring output pixels using a corresponding second and third said multibit data pixel;

comparing means, coupled to said determining means, for generating a comparison of said first modulation pattern with said second and third modulation patterns to determine the exact manner in which said current output pixel is to be imaged; and, modulating means, coupled to said comparing means, for modulating said current output pixel in accordance with said comparison to generate either (1) an output modulation pattern derived from said first modulation pattern and not from said second or third modulation patterns or (2) a reverse of said output modulation pattern.

6. An apparatus as described in claim 5 wherein said first, second and third modulation patterns are determined using said first, second and third multibit data pixels, respectively, to index a lookup table containing exact bit sequences for modulating each corresponding said output pixel.

7. An apparatus as described in claim 6 wherein said neighboring output pixels include a first neighboring output pixel disposed to the left of said current output pixel and a second neighboring output pixel disposed to the right of said current output pixel.

8. An apparatus as described in claim 6 wherein an exact bit sequence from said lookup table corresponding to said current output pixel is either directly used to modulate said current output pixel or is reversed and used to image said current output pixel according to said comparison.

9. A method for performing context sensitive pixel modulation in an imaging system which utilizes a plurality of encodings including imaging information for modulating a plurality of corresponding output pixels, said method comprising the steps of:

determining a set of modulation patterns for a current output pixel based on said encodings, said set comprised of a first modulation pattern derived as a function of solely encoding information of said current output pixel and not derived from encoding information of neighboring pixels to said current output pixel and wherein said set also includes a reverse of said first modulation pattern;

selecting from said set of modulation patterns a preferred modulation pattern for said current output pixel based on encoding information of said neighboring pixels to said current output pixel; and, modulating said current output pixel in accordance with said preferred modulation pattern.

10. A method as described in claim 9 wherein said modulation patterns are determined using said encodings to index a lookup table containing exact bit sequences for modulating said output pixels.

11. A method as described in claim 10 wherein said neighboring output pixels include a first neighboring output pixel disposed to the left of said current output pixel and a second neighboring output pixel disposed to the right of said current output pixel.

12. A method as described in claim 10 wherein an exact bit sequence from said lookup table corresponding to said current output pixel is either directly used to modulate said current output pixel or is reversed and used to modulate said current output pixel according to said preferred modulation pattern.

13. An apparatus for performing context sensitive pixel modulation in an imaging system which includes means for creating a plurality of encodings including imaging information for modulating a plurality of corresponding output pixels, said apparatus comprising:

determining means for determining a set of modulation patterns for a current output pixel based on said encodings, said set comprised of a first modulation pattern derived as a function of solely said current output pixel and a reverse of said first modulation pattern;

selecting means, coupled to said determining means, for selecting from said set of modulation patterns a preferred modulation pattern for said current output pixel based on encoding information of said current output pixel's neighboring pixels; and, modulating means, coupled to said selecting means, for modulating said current output pixel in accordance with said preferred modulation pattern.

14. An apparatus as described in claim 13 wherein said modulation patterns are determined using said encodings to index a lookup table containing exact bit sequences for modulating said output pixels.

15. An apparatus as described in claim 14 wherein said neighboring output pixels include a first neighboring output pixel disposed to the left of said current output pixel and a second neighboring output pixel disposed to the right of said current output pixel.

16. An apparatus as described in claim 14 wherein an exact bit sequence from said lookup table corresponding to said current output pixel is either directly used to modulate said current output pixel or is reversed and used to modulate said current output pixel according to said preferred modulation pattern.

17. A method of printing in an imaging system which utilizes a plurality of encodings, said encodings including at least imaging information for modulating a plurality of corresponding output pixels, said method comprising the steps of:

analyzing encodings of neighboring pixels to a current pixel;

determining a proper output modulation pattern for said current pixel based on said step of analyzing; and generating a first modulated pattern or a second modulated pattern depending on said proper output modulation pattern, said first modulated pattern derived from an encoding of said current pixel and not derived from encodings of said neighboring pixels, and wherein said second modulated pattern being a reverse of said first modulated pattern.

18. A method of printing as described in claim 17 wherein said first modulated pattern corresponds to a first pixel growth direction and wherein said second modulated pattern corresponds to a second pixel growth direction.

* * * * *